C. L. POOR.
DIRECTION INDICATOR.
APPLICATION FILED JAN. 10, 1918.
1,289,904.
Patented Dec. 31, 1918.
2 SHEETS—SHEET 2.
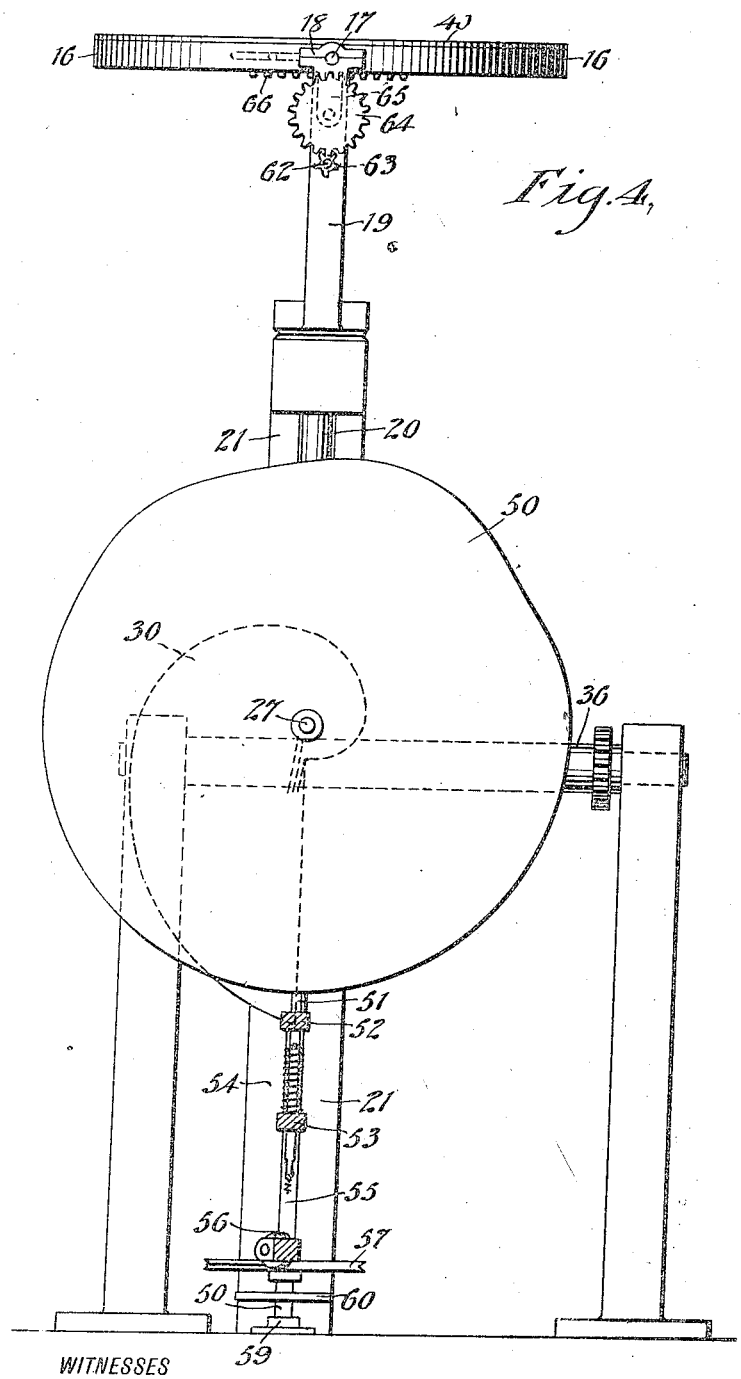
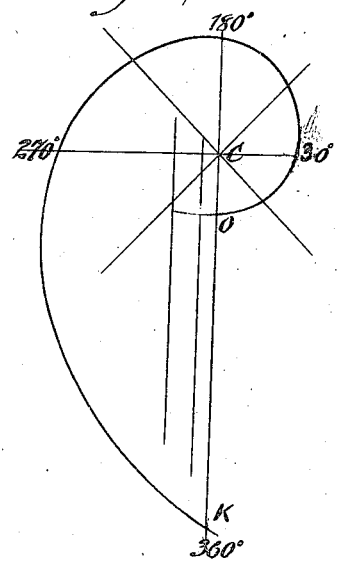
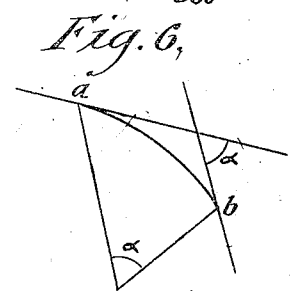
WITNESSES
Edw. Thorpe
INVENTOR
Charles Lane Poor
BY
ATTORNEYS

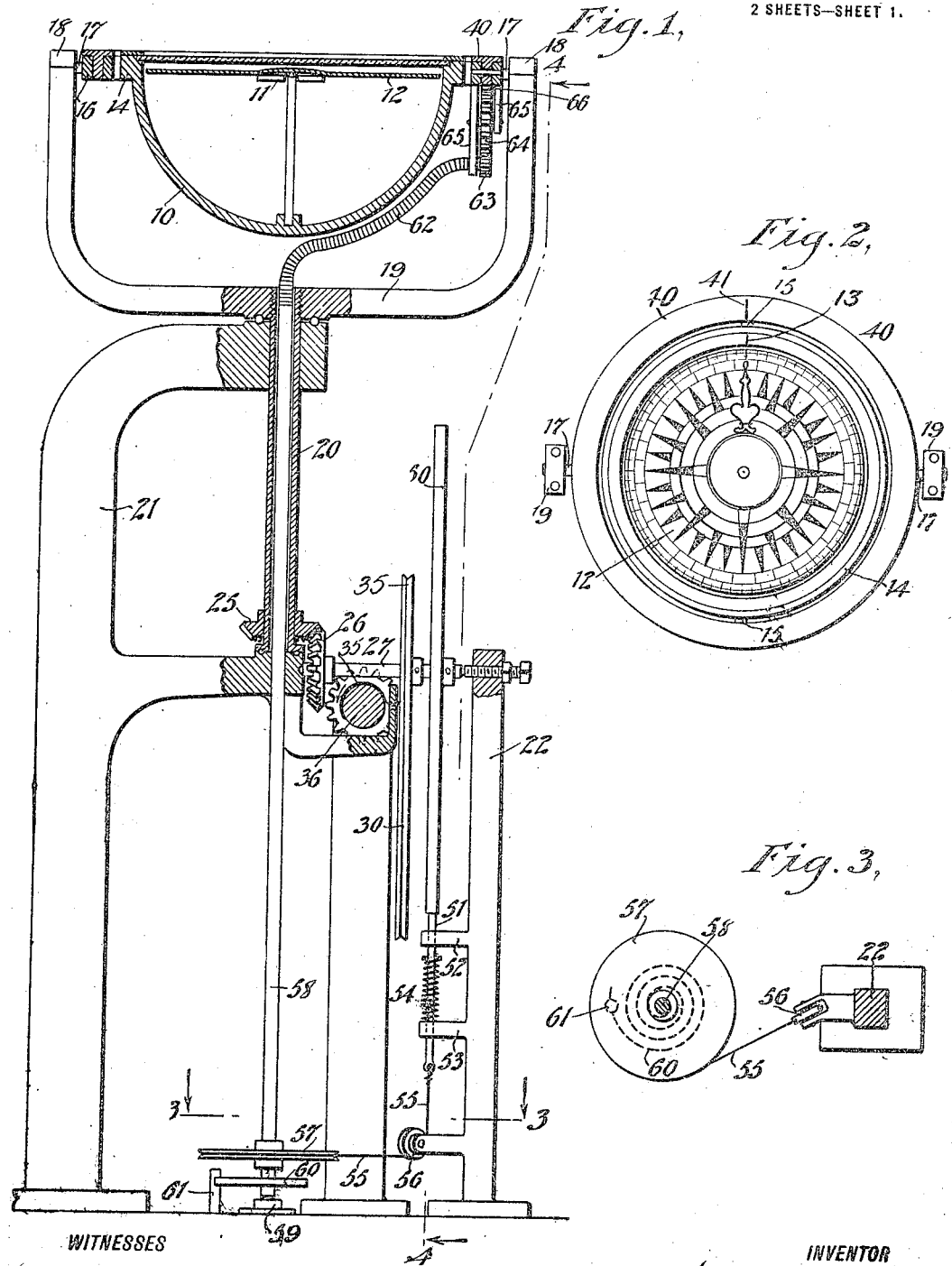

UNITED STATES PATENT OFFICE.

CHARLES LANE POOR, OF SHELTER ISLAND, NEW YORK.

DIRECTION-INDICATOR.

1,289,904.  Specification of Letters Patent.  Patented Dec. 31, 1918.

Application filed January 10, 1918. Serial No. 211,223.

*To all whom it may concern:*

Be it known that I, CHARLES LANE POOR, a citizen of the United States, and a resident of the village of Dering Harbor, Shelter Island, in the county of Suffolk and State of New York, have invented a new and Improved Direction-Indicator, of which the following is a full, clear, and exact description.

The invention relates to aerial and marine navigation, and its object is to provide a new and improved direction indicator more especially designed to enable a navigator to keep a vessel on a spiral course known as a "search curve" or on any portion of such course, or upon an irregular broken course composed of sections of such spiral curve. Another object is to automatically correct the indication of the course of the vessel for the deviation of the compass on all points of sailing.

The invention is based on two principles of logarithmic spirals, namely, first, the angle between the radius drawn from the center to a point on the curve, and the line tangent to the curve at this point is constant and the same for every point of the curve, and, second, the length of the arc of the curve between any two points is a constant multiple of the difference between the length of the radii drawn to the ends of the arc. If a vessel on the sea or in the air sails along the arc of the curve shown in Fig. 6 from *a* to *b* then the change in the course sailed is exactly equal to the angle *a* and this equality of change of course or direction with the angle *a* at the center is maintained under all conditions of speed, and in whichever direction the vessel may proceed along the spiral curve forward or backward. In order to utilize these principles and to cause a vessel to follow a course corresponding to such spiral curve, use is made of a guiding means for guiding the vessel on the spiral course. The guiding means is preferably in the form of a miniature course in the shape of a revoluble cam having its peripheral face representing the curve and connected with the bowl of the mariner's compass on board of the vessel, and means for rotating the said cam and hence the compass bowl to vary the position of the "lubber line," the angular rotation representing the "change in course" of a vessel moving along a spiral curve at an approximately constant speed.

In order to compensate for the deviation of the compass at all points of sailing, use is made of an automatic correcting means connected with the compass for correcting the deviation thereof, the said correcting means consisting preferably of an auxiliary lubber line movable relative to the regular lubber line, and means connected with the said auxiliary lubber line and representing the deviation of the compass for a predetermined course and driven in unison with the movement of the vessel over the course.

A practical embodiment of the invention is represented in the accompanying drawings forming a part of this specification, in which similar characters of reference indicate corresponding parts in all the views.

Figure 1 is a sectional side elevation of the automatic steering device;

Fig. 2 is a plan view of the compass;

Fig. 3 is a sectional plan view of the automatic steering device on the line 3—3 of Fig. 1;

Fig. 4 is a cross section of the same on the line 4—4 of Fig. 1;

Fig. 5 is a face view of the actuating cam, the peripheral edge of which represents a spiral curve which is a miniature of a spiral course to be sailed by the vessel;

Fig. 6 is a diagrammatic view of a portion of the spiral curve;

Fig. 7 is a diagrammatic view of a close spiral curve; and

Fig. 8 is a similar view of a more open spiral curve.

As illustrated in Figs. 1 and 2, the bowl 10 of the compass is provided with the usual magnetic needle 11, a card 12 and the lubber line 13, and the rim of the bowl 10 is provided with a gimbal 14 connected by diametrically opposite pivots 15 with the outer gimbal 16 provided with diametrically opposite pivots 17, the axes of which are at a right angle to the axes of the pivots 15. The pivots 17 are journaled in suitable bearings 18 arranged on a frame 19 provided with a hollow shaft 20 disposed centrally relative to the bowl 10 and mounted to turn in suitable bearings arranged on a standard 21 attached to the vessel at the point at which the mariner's compass is usually located. The shaft 20 is provided with a bevel gear wheel 25 in mesh with a bevel gear wheel 26 secured on a horizontally disposed shaft 27 journaled in suitable bearings arranged on the standard 21 and on a standard 22 likewise secured on the vessel. On the shaft 27 is secured a spiral course cam 30, the peripheral edge of which is in the form of a spiral curve representing the spiral course to be sailed by the vessel. The spiral edge of the cam 30 is graduated in circular divisions (degrees) and the center of the cam coincides with the center of the shaft 27. The cam is rotated in such a manner that its peripheral edge moves in unison with the angular rotation which represents at all times the change in course of the vessel moving along a spiral curve at a constant speed.

In order to rotate the spiral cam 30 as described, various mechanical means may be employed; for instance, as shown, a cord 35 is attached to the outer end of the peripheral edge of the cam 30 and is passed around the spiral edge and extends from the inner end thereof onto the peripheral edge of a drum 36, to be wound up thereon on rotating the drum 36 in the direction indicated by the arrow in Fig. 1. The cord 35 winds on the drum 36 in a spiral, and owing to the constant relation between the radii and the arc of the spiral curve this spiral will be uniform. The drum 36 is rotated uniformly and hence the spiral cam 30 rotates at a constantly varying speed but in such a way that at every instant the total rotation of the cam is equal to the total change in the course of the vessel moving in a spiral curve. The drum 36 may be driven by suitable gearing from the speed indicator or revolution counter of the propeller shaft or by clockwork, but in each instance the drum is rotated at such uniform rate that the cord 35 is drawn off at a rate representing the speed of the vessel. It will be noticed that the cam 30 is geared with the frame 19 of the compass which carries the bowl of the compass, hence the said bowl is rotated in unison with the movement given by the cam 30 to the shaft 27 so that the lubber line 13 is shifted to correspond to the speed of the vessel.

In starting the ship on its course, the lubber line 13 is in normal position, that is, it coincides with the heading of the ship, and the cord 35 is in contact with the inner end of the peripheral edge of the cam 30. Now presuming that the course of the vessel is north, it will be necessary for the helmsman to keep the north point of the compass card 12 always on the lubber line 13, but as the vessel proceeds on its course the bowl 10 is turned, as previously mentioned, and consequently the lubber line 13 is shifted from the right to the left from its normal position. From the foregoing it will be seen that as the helmsman steers the vessel by the lubber line 13 and the position of the latter is varied as above described, it is evident that the ship sails a spiral course represented by the peripheral edge of the cam 30.

The absolute direction in which the north point of a compass card points varies with the direction in which the vessel is headed. This is the "deviation of the compass" and by the use of magnets the compass can be reasonably well adjusted, but the deviation cannot be entirely eradicated by the present known means. The error or correction for deviation on each specific direction in which the vessel is headed can be determined by observation and in setting a course this correction must be allowed for. In sailing a spiral curve this deviation would have to be allowed for on the constantly changing course, but in order to do this automatically use is made of a mechanical automatic correcting means presently described in detail. On the outer gimbal 16 is mounted to turn a ring 40 provided on its upper face with an auxiliary lubber line 41 which moves to the right or to the left of the regular lubber line 13 on turning the ring 40 an amount equal to the deviation (but in opposite direction) on a given course. The helmsman instead of steering by the regular lubber line 13 steers by the auxiliary lubber line 41 and thus the course traveled by the vessel is free from errors incident to the deviation of the compass.

In order to automatically adjust the lubber line 41 use is made of a second or deviation cam 50 secured on the shaft 27 and rotating with the same, as previously explained. The peripheral face of the deviation cam 50 is such that at each point it will move the adjustable lubber line ring 40 the proper amount to correct for the deviation. The peripheral face of the deviation cam 50 is engaged by a rod 51 mounted to slide in bearings 52 and 53 arranged on the support 22, and the said rod 51 is held in contact with the peripheral face of the deviation cam 50 by the use of a spiral spring 54. To the lower end of the rod 51 is attached one end of a cord or other flexible connection 55 passing under a guide roller 56 journaled on the standard 22, the other end of the flexible connection 55 extending around the peripheral face of a drum 57 and being attached thereto. The drum 57 is secured on a vertically disposed shaft 58 mounted in a support 59 and extending upward through the hollow shaft 20, as plainly indicated in Fig. 1. The lower portion of the shaft 58 is connected with the inner end of a helical spring 60 attached at its outer end to a fixed post 61. The upper end of the shaft 58 is provided with a flexible shaft 62 provided at its terminal with a pinion 63 in mesh with a gear wheel 64 journaled on brackets 65 depending from the outer gimbal 16. The portion 62 of the shaft 58 is made flexible to allow for the rocking movement of the gimbal 16 incident to the pitching of the ship. It is understood that the shaft 58 is turned in one direction during the time the pin 51 travels inward toward the center of the deviation cam 50, and the torsion spring 60 returns the shaft 58 during the time the pin 51 travels outward on the edge of the deviation cam 50. The gear wheel 64 is in mesh with a gear wheel 66 secured or formed on the ring 40 to turn the same on the gimbal 16. It will be noticed that when the deviation cam 50 is rotated a rotary motion is given to the shafts 58, 62 which by the pinion 63 and the gear wheels 64 and 66 rotate the ring 40 to shift the lubber line 41 to the right or to the left according to the shape of the peripheral face of the deviation cam 50.

Having thus described my invention, I claim as new and desire to secure by Letters Patent:—

1. A direction indicating device for marine or aerial vessels, comprising a mariner's magnetic compass having a revoluble bowl, and guiding means including a revoluble miniature course member, and means connecting the said course member with the said compass bowl to set the compass to a course represented by the said miniature course member.

2. A direction indicating device for marine or aerial vessels, comprising a mariner's magnetic compass having a revoluble bowl, guiding means including a revoluble miniature course member, means connecting the said course member with the said compass bowl to set the compass to a course represented by the said miniature course member, and correcting means connected with the said compass for correcting the deviation thereof while the vessel is sailing on its spiral course.

3. A direction indicating device for marine or aerial vessels, comprising a mariner's magnetic compass provided with a revoluble bowl having a lubber line thereon, and guiding means including a revoluble miniature course member shaped to correspond to a predetermined miniature course and connected with the said bowl to vary the position of the lubber line and thus enable the helmsman to steer the vessel on the said predetermined spiral course.

4. A direction indicating device for marine or aerial vessels comprising a mariner's magnetic compass, guiding means connected with the said compass to enable the helmsman to steer the vessel on a predetermined spiral course, and correcting means connected with the said compass for correcting the deviation thereof while the vessel is sailing on its spiral course.

5. A direction indicating device for marine or aerial vessels, comprising a mariner's magnetic compass having a lubber line and correcting means connected with the said compass for correcting the deviation thereof and including a member provided with an auxiliary lubber line and movable relative to the lubber line of the said compass, and driving means connected with the said member having the auxiliary lubber line and representing the deviation of the compass for a predetermined course and driven in unison with the movement of the vessel over the course.

6. A direction indicating device for marine and aerial vessels, comprising a mariner's magnetic compass having a magnetic needle, a card, and a suspended bowl, and means connected with the said bowl to rotate the latter, the angular rotation representing the change in course of the vessel moving along a spiral curve at an approximately constant speed.

7. A direction indicating device for marine and aerial vessels, comprising a mariner's magnetic compass provided at its suspended bowl with a lubber line, and means for rotating the said bowl to vary the position of the lubber line, the latter forming in all positions tangents of a predetermined curve representing the course of the vessel.

8. A direction indicating device for marine and aerial vessels, comprising a mariner's magnetic compass having a card, a magnetic needle and suspended bowl provided with a lubber line, a miniature course member representing the predetermined course to be sailed by the vessel, means for rotating the said miniature course member at a peripheral speed corresponding approximately to the movement of the vessel over the course, and connecting means connecting the said miniature course member with the said bowl to rotate the latter to vary the position of the lubber line.

9. A direction indicating device for marine and aerial vessels, comprising a mariner's magnetic compass having a card, a magnet needle and a bowl provided with a lubber line, a miniature course member rotating with the said bowl and being in the form of a cam, the peripheral face of which represents the predetermined course to be sailed by the vessel, and means for turning the cam in unison with the movement of the vessel over the course.

10. A direction indicating device for marine and aerial vessels, comprising a mariner's magnetic compass, and actuating means connected with the bowl of the mariner's compass to rotate the said bowl at a peripheral speed corresponding to the movement of the vessel over a predetermined course.

11. A direction indicating device for marine and aerial vessels, comprising a mariner's magnetic compass, a cam representing a predetermined search curve, driving means connecting the said cam with the bowl of the said mariner's compass to rotate the said bowl, and means rotating the cam at a peripheral speed corresponding approximately to the movement of the vessel over a course following the said predetermined search curve.

12. A direction indicating device for marine and aerial vessels, comprising a mariner's magnetic compass provided with a regular lubber line, a member having an auxiliary lubber line and movable relative to the said regular lubber line, and automatic means connected with the said auxiliary lubber line and representing the deviation of the compass for a predetermined course of the vessel and driven in unison with the movement of the vessel over the said course.

13. A direction indicating device for marine and aerial vessels, comprising a mariner's magnetic compass provided with a bowl having a fixed lubber line thereon, a lubber line carrier adjacent the said bowl and provided with an auxiliary lubber line adapted to move into and out of register with the said lubber line fixed on the bowl, and driving means for the said carrier and driven in unison with the movement of the vessel over a predetermined course, and controlling means connected with the said driving means and shaped to correspond to the deviation of the compass during the movement of the vessel over the predetermined course.

14. A direction indicating device for marine and aerial vessels, comprising a mariner's magnetic compass provided with bowl having a fixed lubber line on the rim of the bowl, a ring mounted to turn adjacent the rim of the bowl and provided with an auxiliary lubber line for the vessel to be steered by, and means for shifting the said ring in either direction by an amount equal to the deviation of the compass on a predetermined course.

15. A direction indicating device for marine and aerial vessels, comprising a mariner's magnetic compass provided with a bowl having a fixed lubber line, a lubber line carrier provided with an auxiliary lubber line and movable on the compass relative to the said lubber line fixed on the bowl, a revoluble spiral course cam, a deviation cam rotating with the said spiral course cam, means connecting the said spiral course cam with the said bowl to rotate the latter, and means connecting the said deviation cam with the said auxiliary lubber line carrier to rotate it.

16. A direction indicating device for marine and aerial vessels, comprising a mariner's magnetic compass having a bowl provided with a fixed lubber line, a shaft attached centrally to the said bowl to rotate the latter, a spiral course cam connected with the said shaft, means for rotating the said cam, a lubber line ring mounted on the compass and provided with an auxiliary lubber line, a deviation cam rotating in unison with the said spiral course cam, a spring pressed shaft rotated from the said deviation cam and provided with a flexible extension shaft, and a gearing connecting the said flexible extension shaft with the lubber line ring.

CHARLES LANE POOR.